(12) United States Patent
Lessmueller et al.

(10) Patent No.: US 11,103,952 B2
(45) Date of Patent: Aug. 31, 2021

(54) LASER BEAM WELDING OF GEOMETRIC FIGURES USING OCT SEAM TRACKING

(71) Applicant: Lessmueller Lasertechnik GmbH, Munich (DE)

(72) Inventors: Eckhard Lessmueller, Munich (DE); Christian Truckenbrodt, Munich (DE)

(73) Assignee: LESSMUELLER LASERTECHNIK GMBH, Munich (DE)

( * ) Notice: Subject to any disclaimer, the term of this patent is extended or adjusted under 35 U.S.C. 154(b) by 263 days.

(21) Appl. No.: 16/152,062

(22) Filed: Oct. 4, 2018

(65) Prior Publication Data

US 2019/0126388 A1 May 2, 2019

(30) Foreign Application Priority Data

Oct. 27, 2017 (DE) .................... 10 2017 010 055.1

(51) Int. Cl.
*B23K 26/00* (2014.01)
*B23K 26/03* (2006.01)
(Continued)

(52) U.S. Cl.
CPC ........ *B23K 26/032* (2013.01); *B23K 26/0884* (2013.01); *B23K 26/28* (2013.01);
(Continued)

(58) Field of Classification Search
CPC ...... B23K 26/03–0344; B23K 26/0884; B23K 26/28; B23K 31/125; G01B 11/08; G01B 11/10; G01B 9/02091
(Continued)

(56) References Cited

U.S. PATENT DOCUMENTS

2004/0245227 A1* 12/2004 Grafton-Reed ...... B23K 26/043
219/121.83
2011/0132881 A1* 6/2011 Liu ..................... B23K 26/082
219/121.71
(Continued)

FOREIGN PATENT DOCUMENTS

DE 102011016519 A1 10/2012
DE 102012212278 A1 1/2014
(Continued)

*Primary Examiner* — Sang Y Paik
(74) *Attorney, Agent, or Firm* — Moore & Van Allen PLLC; Henry B. Ward, III

(57) ABSTRACT

A measuring device for monitoring a laser welding process that is connectable to a machining device for machining a workpiece by a high-energy processing beam that is displaceable on the workpiece along a main machining path that corresponds to a contour of a closed geometric figure. The measuring device includes an optical coherence tomography unit having a measuring beam source for generating an optical measuring beam that is displaceable on the workpiece by at least one movable deflection unit. The optical measuring beam is displaceable on the workpiece along a first discrete measuring line, along a second discrete measuring line, and along a third discrete measuring line, in each case transversely with respect to the main machining path and intersecting same. The measuring device is configured for determining characteristic features of the geometric figure represented by the main machining path, according to the collected measuring data.

18 Claims, 3 Drawing Sheets

(51) Int. Cl.
*G01B 11/10* (2006.01)
*B23K 26/08* (2014.01)
*B23K 26/28* (2014.01)
*B23K 31/12* (2006.01)
*G01B 9/02* (2006.01)
*G01B 11/08* (2006.01)

(52) U.S. Cl.
CPC ........ *B23K 31/125* (2013.01); *G01B 9/02091* (2013.01); *G01B 11/08* (2013.01); *G01B 11/10* (2013.01)

(58) Field of Classification Search
USPC ......................................... 219/121.6–121.83
See application file for complete search history.

(56) References Cited

U.S. PATENT DOCUMENTS

| | | | |
|---|---|---|---|
| 2015/0246413 A1* | 9/2015 | Kawakita | G01J 1/42 219/121.64 |
| 2015/0338210 A1* | 11/2015 | Lessmuller | B23K 26/032 250/492.1 |
| 2016/0284103 A1* | 9/2016 | Huang | G01B 9/0203 |

FOREIGN PATENT DOCUMENTS

| | | |
|---|---|---|
| DE | 102014113283 A1 | 3/2016 |
| DE | 102015007142 A1 | 12/2016 |
| DE | 102016014564 A1 | 6/2018 |
| EP | 1977850 A1 | 10/2008 |

* cited by examiner

LASER BEAM WELDING OF GEOMETRIC FIGURES USING OCT SEAM TRACKING

FIELD

The invention relates to a measuring device and a method for monitoring a machining process, in particular a laser welding process, for the purpose of controlling, regulating, or checking. The invention further relates to a system for machining and monitoring a workpiece, including a machining device and a measuring device. The measuring device is connected or connectable to the machining device for machining the workpiece by means of a high-energy processing beam that is displaceable on the workpiece along a main machining path that is linear or that corresponds to a contour of an open or closed geometric figure. The measuring device includes an optical coherence tomography unit having a measuring beam source for generating an optical measuring beam that is displaceable on the workpiece by means of at least one movable deflection unit.

BACKGROUND OF THE INVENTION

These types of measuring devices and systems are known from the prior art. In known laser material machining processes, a high-energy processing beam in the form of a laser processing beam is generated by means of a processing beam source of the machining device in order to act on one or more workpieces or workpiece parts, for example to weld them together in the area of a lap joint, a seam, and/or a joint edge.

It is known that the measuring device may be coupled to the machining device and mounted on a robot, so that they are moved together along the main machining path in the machining direction by means of the robot, wherein the machining direction may vary continuously or discontinuously, depending on the course of the main machining path on the workpiece during the machining. Alternatively or additionally, the relative movement between the workpiece and the processing beam may be achieved by displacing the processing beam and/or moving the workpiece. By means of movable optics such as a movable processing beam deflection unit, the processing beam may be moved on the workpiece in addition to or as an alternative to the robot movement. For example, an oscillating motion of the optical measuring beam and/or of the high-energy processing beam may thus be generated.

A device for controlling machining of a workpiece is known from the document DE 10 2011 016 519 A1, for example, in which a processing beam focus lens is movable perpendicularly with respect to its optical axis in order to orient a processing beam on the workpiece. In addition, the device includes a measuring light focus lens that is movable perpendicularly with respect to its optical axis in order to displace an illumination field, generated by measuring light, on the workpiece.

The optical coherence tomography (OCT) method, which is finding increasing use in the prior art for collecting measuring data, is based on the fundamental principle of light wave interference and resulting effects. Optical coherence tomography allows height differences to be detected in the micron range along an optical measuring beam axis. For this purpose, an optical measuring beam and an optical reference beam are generated by means of the measuring beam source of the optical coherence tomography unit. The optical measuring beam passes through a measuring arm, and at one end of the measuring arm strikes the workpiece to be monitored or machined. The optical measuring beam is at least partially reflected on the workpiece and is returned to a beam splitter of the optical coherence tomography unit. The optical reference beam passes through a reference arm and is at least partially reflected on one end of the reference arm, whereupon the reflected optical reference beam is likewise returned to the beam splitter. Lastly, the superimposition of the reflected optical measuring beam and the reflected optical reference beam is detected to obtain height information at the particular measuring point on the workpiece, taking into account the length of the reference arm.

Against this background, it is understood that, within the meaning of the invention, collecting measuring data or carrying out measurements by means of the optical measuring beam is intended to mean collecting measurement information at an instantaneous measuring point on the workpiece. This measurement information, in addition to height information, for example topographical information concerning the workpiece surface and/or information concerning a penetration depth of the processing beam, may include further information about the position of the instantaneous measuring point on the workpiece, which may be linked with the height information.

A measuring device that includes an optical coherence tomography unit is known from the document DE 10 2015 007 142 A1, for example. The measuring device also includes a movable optical component, situated in the beam path of the optical measuring beam, for displacing the optical measuring beam in different measuring positions on the workpiece.

The document DE 10 2014 113 283 A1 discloses a device for remote laser machining, including a machining device and a measuring device having an optical coherence tomography unit. For monitoring a machining process, an optical measuring beam is cyclically displaceable on an analysis path about an instantaneous machining position on the workpiece by means of a movable guide element.

Furthermore, a device having a machining device and an optical coherence tomography unit is known from the document EP 1 977 850 A1. The device includes a movable deflection unit, situated between the device and a workpiece, by means of which a processing beam and an optical measuring beam are displaceable on the workpiece surface.

Moreover, the document DE 10 2012 212 278 A1 relates to a system for providing boreholes or weld seams on a workpiece. For this purpose, a laser beam is displaceable on the workpiece by means of a laser beam deflection unit. The laser beam deflection unit includes two X/Y scanners. An optical measuring beam that is generated by means of an optical coherence tomography unit is likewise projectable onto the workpiece via one of the two X/Y scanners.

BRIEF SUMMARY OF THE INVENTION

Although numerous measuring devices for monitoring a machining process by means of an optical measuring beam are already known from the prior art, the object is to further improve such measuring devices, systems, and methods in order to expand their fields of application.

This object is achieved by a measuring device for monitoring a machining process comprising a welding process that is connected or connectable to a machining device for machining a workpiece by means of a high-energy processing beam that is displaceable on the workpiece along a main machining path that is linear or that coresponds to a contour of an open or closed geometric figure. The measuring device includes an optical coherence tomography uit having a measuring beam source for generating an optical measuring beam that is displaceable on the workpiece by means of at least one movable deflection unit, the at least one moveable deflection unit being a measuring beam deflection unit of the measuring device that deflects only the optical measuring beam, and the optical measuring beam being additionally deflectable by means of a movable processing beam deflection unit of the machining device that deflects the optical measuring beam and the proessing beam. The optical measuring beam for collecting measuring data by means of the at least one movable deflection unit is displaceable on the workpiece along at least one first discrete measuring line, transversely with rspect to the main machining path and intersecting same. The maasuring defice is configured for determining characteristic features of the geometric figure represented by the main machining path, according the collected measuring data.

According to a further embodiment of the measuring device for monitoring a machining process comprising a welding process, the geometric figure is a circle and the measuring device is configured for determining at least one selected from the group comprising a position of a midpoint of the circle on the workpiece and a diameter of the circle according to the collected measuring data. In another embodiment, the measuring device is configured for determining, during the machining process, the characteristic eatures of the geometric figure represented by the main machining path. In another embodiment, the measuring beam deflection unit is configured for displacing the optical measurin beam, taking into account a deflection motion of the optical measuring beam by the processing beam deflection unit. In another embodiment, the at least one movable deflection unit includes a displaceable biaxial scanner system. In another embodiment, the at least one movable deflection unit includes a focus lens or collimating lens that is displaceable laterally with respect to an optical axis of the measuring beam. In another embodiment, the measuring device is movable relative to the workpiee by means of a robot that is coupled to the measuring device, and the at least one deflection unit is configured for displacing the optical measuring beam, taking into account a movement of the measuring device by the robot. In another embodiment, for collecting measuring data by means of the at least one movable deflection unit, the measuring device is additionally displaceable on the workpiece along a second discrete measuring line.

This object is also achieved by a system for machining and monitoring a workpiece, including a machining device and a measuring device that is connected to the machining device, wherein the machining device is configured for machining the workpiece by means of a high-energy processing beam, which is displaceable on the workpiece along a main machining path that corresponds to a contour of a closed geometric figure, by means of a movable processing beam deflection unit of the machining device. The measuring device includes an optical coherence tomography unit with a measuring beam source for generating an optical measuring beam, which is displaceable on the workpiece by means of (i) at least one movable measuring beam deflection unit of the measuring device that deflects only the optical measuring beam and (ii) the movable processing beam deflection unit of the machining device that deflects the optical measuring beam and the high-energy processing beam. The optical measuring beam for collecting measuring data by means of (i) the at least one movable measuring beam deflection unit of the measuring device and (ii) the movable processing beam deflection unit of the machining device is displaceable on the workpiece along at least one first discrete measuring line, in each case transversely with respect to the main machining path and intersecting same. The measuring device is configured for determining characteristic features of the geometric figure represented by the main machining path, according to the collected measuring data.

According to a further embodiment of the system for machining and monitoring a workpiece, the geometric figure is a circle, and the measuring device is configured for determining at least one selected from the group comprising a position of a midpoint of the circle on the workpiece and a diameter of the circle according to the collected measuring data. In another embodiment, the measuring device is configured for determining the characteristic features of the geometric figure represented by the main machining path during the machining of the workpiece by the machining device. In another embodiment, the at least one movable measuring beam deflection unit of the measuring device is configured for displacing the optical measuring beam, taking into account a deflection motion of the optical measuring beam by the processing beam deflection unit of the machining device. In another embodiment, the system comprises at least one selected from the group comprising (i) the at least one movable measuring beam deflection unit of the measuring device and (ii) the movable processing beam deflection unit of the machining device includes a displaceable biaxial scanner system. In another embodiment, the system comprises at least one selected from the group comprising (i) the at least one movable measuring beam deflection unit of the measuring device and (ii) the movable processing beam deflection unit of the machining device includes a focus lens or collimating lens that is displaceable laterally with respect to an optical axis of the measuring beam. In another embodiment, the system is movable relative to the workpiece by means of a robot that is coupled to the system, wherein the system comprises at least one selected from the group comprising (ii) the at least one measuring beam deflection unit of the measuring device and (ii) the movable processing beam deflection unit of the machining device is configured for displacing the optical measuring beam, taking into account a movement of the system by the robot. In another embodiment, collecting measuring data by means of the at least one movable deflection unit, the measuring device is additionally displaceable on the workpiece along a second discrete measuring line.

The object is also achieved by a method for monitoring a machining process of a workpiece by means of a high-energy processing beam of a machining device that is displaced on the workpiece along a main machining path that corresponds to a contour of a closed geometric figure. The method comprises generating an optical measuring beam by means of a measuring beam source of an optical coherence tomography unit. The method further comprises displacing the optical measuring beam on the workpiece by means of at least one movable deflection unit, the at least one moveable deflection unit being a measuring beam deflection unit of the measuring device that deflects only the optical measuring beam, and the optical measuring beam being additionally deflectable by means of a movable processing beam deflection unit of the machining device that deflects the optical measuring beam and the high-energy processing beam. The optical measuring beam for collecting measuring data is displaced on the workpiece by means of the at least one movable deflection unit along at least one first discrete measuring line, in each case transversely with respect to the main machining path and intersecting same. The characteristic features of the geometric figure represented by the main machining path are determined by means of the measuring device, according to the collected measuring data.

According to a further embodiment of the method for monitoring a machining process of a workpiece, the optical measuring beam for collecting measuring data by means of the at least one movable deflection unit of the measuring device is additionally displaced on the workpiece along a second discrete measuring line.

Preferred embodiments will become apparent from the following description.

According to the invention, a measuring device of the type stated at the outset is provided, in which the optical measuring beam for collecting measuring data by means of the at least one movable deflection unit is displaceable on the workpiece (W) along at least one first discrete measuring line (86), transversely with respect to the main machining path (80) and intersecting same. The measuring device is configured for determining characteristic features of the geometric figure represented by the main machining path, according to the collected measuring data.

In other words, by means of the measuring device, or more precisely, by means of the at least one movable deflection unit, the optical measuring beam may be displaced on a plurality of measuring points along the at least one discrete measuring line in order to scan the measuring line and collect measuring data at each of the measuring points. A height profile in the area of the at least one discrete measuring line may be determined from the measuring data obtained in this way. Since the main machining path (a lap joint, a seam, and/or a joint edge, for example) in the height profile may be clearly differentiated from the surrounding workpiece surface, an exact position of the main machining path at at least one location on the workpiece may thus be determined. This position may be determined, for example, as coordinates in a coordinate system of the measuring device and/or the machining device. Depending on the knowledge about the geometric properties of the main machining path, for example knowledge about its geometric shape and its direction, for determining the location of the main machining path on the workpiece it may be sufficient to detect only one discrete measuring line. If the main machining path is, for example, a straight line having a known direction, it is sufficient to determine only its position to be able to establish its actual location on the workpiece. It is understood that, by displacing the optical measuring beam along more than one discrete measuring line, in each case transversely with respect to the main machining path and intersecting same, correspondingly more than three positions of the main machining path are determinable on the workpiece or in the coordinate system. For more complex geometric open or closed figures that form the main machining path, it may be necessary to provide multiple measuring lines in order to determine the geometry, the course, and the location of the main machining path on the workpiece.

It is noted that according to the invention, the processing beam may be selectively moved relative to the stationary workpiece, or the workpiece may be moved relative to the processing beam with the processing beam stationary, or both the processing beam and the workpiece may be moved relative to one another in order to achieve a relative movement between processing beam and the radiating workpiece.

It is possible to determine characteristic features of the geometric figure represented by the main machining path by determining at least one exact position of the main machining path on the workpiece. In particular, the type of geometric figure, its dimensions, and/or its location on the workpiece may thus be precisely determined from the collected measuring data. The knowledge of characteristic features and properties of the main machining path allows more precise process control and improved monitoring of the machining process. Monitoring the machining process by the measuring device according to the invention may thus allow precise control of the machining process, in that process parameters may be adapted during machining, according to the geometric figure that is determined by means of the collected measuring data.

According to one preferred refinement of the invention, it may be provided that for collecting measuring data by means of the at least one movable deflection unit, the measuring device is additionally displaceable on the workpiece along a second discrete measuring line, preferably additionally displaceable along a third discrete measuring line, transversely with respect to the main machining path and intersecting same.

At least the approximate course of the main machining path and/or the approximate location of the closed geometric contour may be previously known, so that it may be ensured that during the displacement of the optical measuring beam at least along the at least one, preferably two or three, discrete measuring lines, the main machining path is intersected at at least one location or at different locations of the at least one discrete measuring line or the discrete measuring lines. Depending on the extent that the approximate course of the main machining path is predetermined and previously known, the lengths of the at least three respective measuring lines may be selected to ensure that the main machining path is actually intersected by the, or each, measuring line. That is, for a comparatively unknown course of the main machining path, the measuring line(s) is/are selected to be longer than for an essentially known course. For multiple measuring lines, the lengths of the individual discrete measuring lines may be the same or different. In addition, the distance between the discrete measuring lines may be selected as desired, according to the degree to which the course of the main machining path is previously known or predetermined. Similarly, the particular direction vector of the multiple discrete measuring lines may be selected according to the degree to which the course of the main machining path is previously known or predetermined.

When it is stated in conjunction with the description and claims of the present invention that the present measuring device and the system and method described below are used for "monitoring" a machining process, this is intended to mean that the determined measuring data and the resulting geometric figure represented by the main machining path may be subsequently further utilized, for example, for control or feedback control of the machining process, or for checking the machining process or its results.

In one embodiment of the invention, the geometric figure may be a circle, in this case the measuring device being configured for determining a position of a midpoint of the circle on the workpiece and/or a diameter and/or a radius of the circle according to the collected measuring data. More precisely, the position of the midpoint of the circle in a coordinate system of the measuring device and/or of the machining device may be determined. Using the general equation for a circle $(x-a)^2+(y-b)^2=r^2$ with radius r and midpoint coordinates (a/b), the midpoint and/or the diameter and/or the radius may thus be calculated in a known manner via the detected positions, in this case three, for example, of the geometric figure.

In one alternative embodiment, the geometric figure may be any polygon or any conical section, for example an ellipse, a rectangle, a square, or the like.

According to one refinement of the invention, the measuring device may be configured for determining, during the machining process, the characteristic features of the geometric figure represented by the main machining path. For this purpose, the optical measuring beam in this refinement is displaceable independently of the high-energy processing beam. For example, the at least one movable deflection unit may act only on the optical measuring beam, but not on the high-energy processing beam, in order to displace the former.

In addition, the at least one movable deflection unit may be a measuring beam deflection unit of the measuring device. This may in particular be an embodiment of the present refinement, which allows collection of the measuring data on the at least three discrete lines during the machining process, i.e., in parallel with same.

In one alternative embodiment, the at least one movable deflection unit may be a processing beam deflection unit of the machining device. The deflection unit may thus move the processing beam on the one hand, and the optical measuring beam on the other hand, on the workpiece. In this alternative embodiment, the measuring device need not include an additional measuring beam deflection unit. However, without an additional measuring beam deflection unit, such an embodiment does not allow a determination of the characteristic features of the geometric figure represented by the main machining path during the machining process. Rather, for a measuring device in this embodiment, which does not include a separate measuring beam deflection unit, the characteristic features of the geometric figure represented by the main machining path may be determined prior to the machining process. For this purpose, the processing beam deflection unit, which also displaces the optical measuring beam, is already controllable for scanning the at least three discrete measuring lines by means of the optical measuring beam, before the high-energy processing beam is generated and projected onto the workpiece.

According to another embodiment of the measuring device according to the invention, the optical measuring beam may be deflectable by means of the measuring beam deflection unit of the measuring device, and additionally by means of a movable processing beam deflection unit of the machining device. In addition, the measuring beam deflection unit in this embodiment may be configured for displacing the optical measuring beam, taking into account a deflection motion of the optical measuring beam by the processing beam deflection unit, in particular to determine the characteristic features of the geometric figure represented by the main machining path during the machining process. In other words, by an additional movement of the measuring beam deflection unit, in addition to the displacement of the optical measuring beam, produced by this measuring beam deflection unit, at least along the at least one, preferably two or three, discrete measuring lines, the displacement of the optical measuring beam may be essentially compensated for by the movement of the processing beam deflection unit. The determination of the characteristic features of the geometric figure thus also takes place taking into account the movement of the processing beam deflection unit.

It is understood that in further embodiments, in addition to the at least one movable deflection unit which displaces the optical measuring beam, and which may be a measuring beam deflection unit of the measuring device or a processing beam deflection unit of the machining device, any desired number of additional movable or immovable deflection units of the measuring device and/or of the machining device may be provided.

In one refinement of the invention, the at least one movable deflection unit may include a displaceable biaxial scanner system, in particular a galvanometer scanner.

In one alternative refinement of the invention, the at least one movable deflection unit may include a focus lens or collimating lens that is displaceable laterally with respect to an optical axis of the measuring beam.

In another embodiment according to the invention, the measuring device may be movable relative to the workpiece by means of a robot that is coupled to the measuring device. In this case, the at least one deflection unit may be configured for displacing the optical measuring beam, taking into account a movement of the measuring device or of the optical measuring beam by the robot. The determination of the characteristic features of the geometric figure represented by the main machining path thus also takes place taking into account the movement of the measuring device by the robot.

The invention further relates to a system for machining and monitoring a workpiece, including a machining device and a measuring device that is connected to the machining device. The machining device is configured for machining the workpiece by means of a high-energy processing beam, which is displaceable on the workpiece along a main machining path that is linear or that corresponds to a contour of an open or closed geometric figure, by means of a movable processing beam deflection unit of the machining device. The measuring device includes an optical coherence tomography unit with a measuring beam source for generating an optical measuring beam, which is displaceable on the workpiece by means of at least one movable measuring beam deflection unit of the measuring device and/or the movable processing beam deflection unit of the machining device. According to the invention, the optical measuring beam for collecting measuring data by means of the at least one movable measuring beam deflection unit of the measuring device and/or the movable processing beam deflection unit of the machining device is displaceable on the workpiece at least along at least one first discrete measuring line, transversely with respect to the main machining path and intersecting same. The measuring device is configured for determining characteristic features of the geometric figure represented by the main machining path, according to the collected measuring data.

In the system according to the invention, it may be provided that for collecting measuring data by means of the at least one movable deflection unit, the measuring device is additionally displaceable on the workpiece along a second discrete measuring line, preferably additionally displaceable along a third discrete measuring line, transversely with respect to the main machining path and intersecting same.

In one refinement of the system according to the invention, the geometric figure may be a circle, the measuring device being configured for determining a position of a midpoint of the circle on the workpiece and/or a diameter and/or a radius of the circle according to the collected measuring data. Alternatively, however, the geometric figure may also be any polygon or any conical section, for example an ellipse, a rectangle, a square, or the like.

According to another embodiment, the measuring device may be configured for determining the characteristic features of the geometric figure represented by the main machining path during the machining of the workpiece by the machining device. In this embodiment, the optical measuring beam is displaceable at least by the movable measuring beam deflection unit of the measuring device.

Furthermore, the at least one movable measuring beam deflection unit of the measuring device may be configured for displacing the optical measuring beam, taking into account a deflection motion of the optical measuring beam by the processing beam deflection unit of the machining device.

In one refinement, the at least one movable measuring beam deflection unit of the measuring device and/or the at least one movable processing beam deflection unit of the machining device may include a displaceable biaxial scanner system.

According to another embodiment, the at least one movable measuring beam deflection unit of the measuring device and/or the movable processing beam deflection unit of the machining device may include a focus lens or collimating lens that is displaceable laterally with respect to an optical axis of the measuring beam.

In addition, the system according to the invention may be movable relative to the workpiece by means of a robot that is coupled to the system, wherein the at least one measuring beam deflection unit of the measuring device and/or the movable processing beam deflection unit of the machining device may be configured for displacing the optical measuring beam, taking into account a movement of the system by the robot.

Although some aspects and features have been described only with regard to the measuring device according to the invention, they may correspondingly apply to the system according to the invention and its refinements.

The invention further relates to a method for monitoring a machining process of a workpiece by means of a high-energy processing beam of a machining device that is displaced on the workpiece along a main machining path that is linear or that corresponds to a contour of an open geometric figure or a contour of a closed geometric figure. The method is carried out in particular by means of a measuring device of the type described above. The method according to the invention comprises the steps:

generating an optical measuring beam by means of a measuring beam source of an optical coherence tomography unit, and displacing the optical measuring beam on the workpiece by means of at least one movable deflection unit.

According to the invention, the optical measuring beam for collecting measuring data is displaced on the workpiece by means of the at least one movable deflection unit, at least along at least one first discrete measuring line, transversely with respect to the main machining path and intersecting same, wherein characteristic features of the geometric figure represented by the main machining path are determined by means of the measuring device, according to the collected measuring data.

In the method according to the invention, according to one preferred refinement it may also be provided that the optical measuring beam for collecting measuring data by means of the at least one movable deflection unit of the measuring device is additionally displaced along a second discrete measuring line, preferably additionally displaced along a third discrete measuring line, transversely with respect to the main machining path and intersecting same.

Also in this regard, it is understood that the aspects and features described only with regard to the measuring device according to the invention may correspondingly apply to the method according to the invention and its refinements.

BRIEF DESCRIPTION OF THE SEVERAL VIEWS OF THE DRAWINGS

Preferred embodiments of the invention are explained in greater detail below with reference to the appended schematic drawings, which show the following.

DETAILED DESCRIPTION OF EMBODIMENTS OF THE INVENTION

Figure 1:
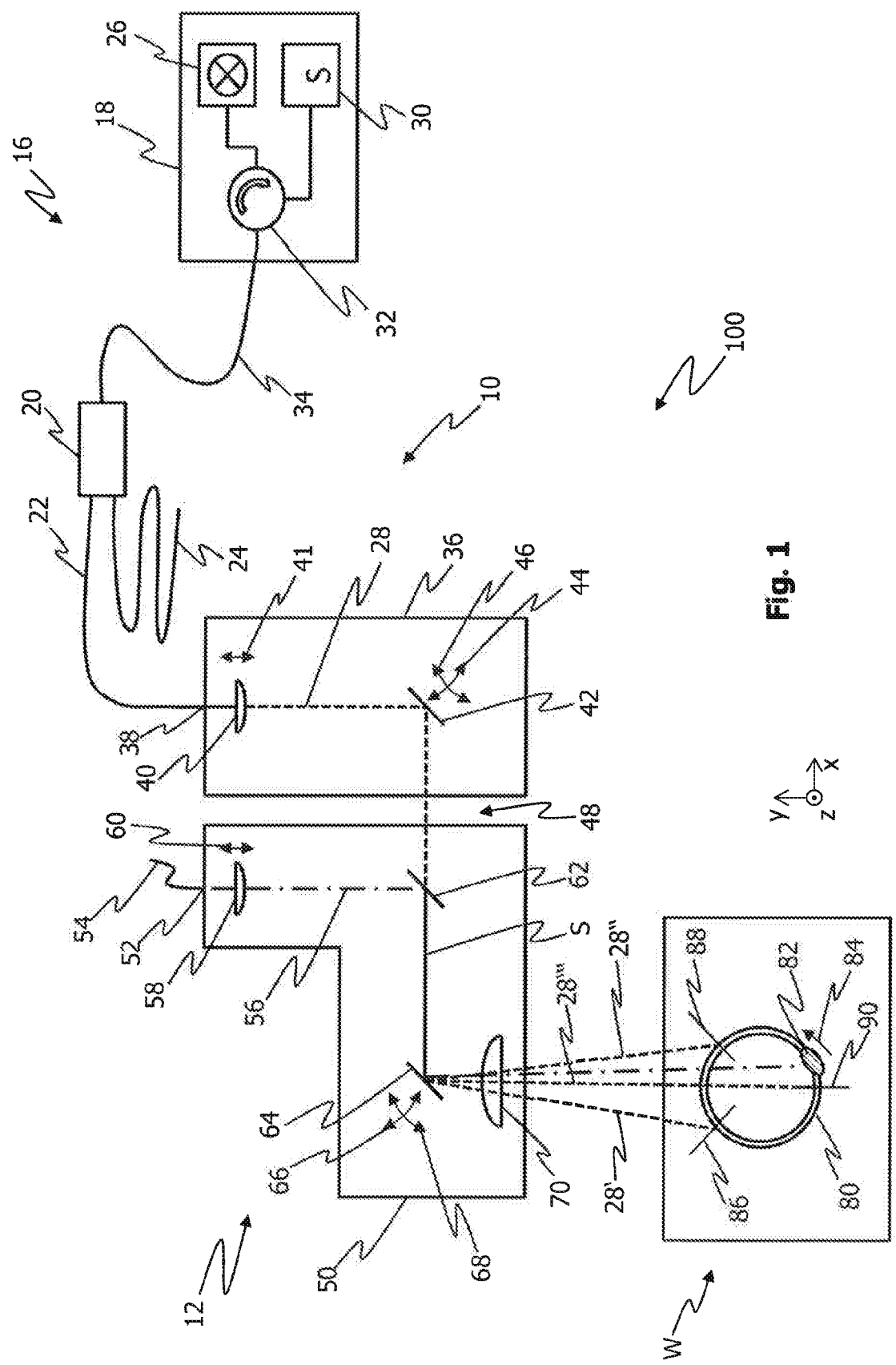
FIG. 1 shows an overall view of a first exemplary embodiment of a system according to the invention, with a measuring device and a machining device.

FIG. 1 shows an overall arrangement of a first exemplary embodiment of the invention, with a measuring device according to the invention that is denoted overall by reference numeral 10. In the example shown, the measuring device 10 is connected to a machining device 12. Together, the measuring device 10 and the machining device 12 form an overall system 100 according to the invention for machining and monitoring a workpiece W.

The measuring device 10 includes an optical coherence tomography (OCT) unit 16 having an OCT measuring device 18 that is connected to a measuring arm 22 and a reference arm 24 via a beam splitter 20.

The OCT measuring device 18 has a measuring beam source 26 for generating an optical measuring beam 28, and a spectrometer 30 for detecting superimposed measuring radiation. In addition, the OCT measuring device 18 may include a circulator 32, shown in FIG. 1, that selectively connects the beam splitter 20 to the measuring beam source 26 or to the spectrometer 30 via a transport fiber or an optical fiber 34.

The measuring arm 22 of the optical coherence tomography unit 16 is connected to measuring optics 36 of the measuring device 10. The optical measuring beam 28 is coupled into the measuring optics 36 via an interface 38 of the measuring optics 36, and passes through a displaceable collimating lens 40 that is adjustable in the direction of the arrow 41. In the measuring optics 36, the optical measuring beam 28 strikes a movable deflection unit 42, or more precisely, a movable measuring beam deflection unit 42.

The movable measuring beam deflection unit 42 is displaceable about two axes in the direction of the arrows 44, 46 in order to deflect the optical measuring beam 28 in the desired manner and move it on the workpiece W. In the exemplary embodiment shown, the movable measuring beam deflection unit 42 is designed in the form of a displaceable galvanometer scanner; alternatively, a design in the form of some other displaceable optical component, such as a wobble mirror, a rotatable wedge plate, or the like, is possible.

It is also apparent from FIG. 1 that the measuring optics 36 of the measuring device 10 are coupled to machining optics 50 of the machining device 12 via a shared interface 48.

The machining optics 50 of the machining device 12 have an interface 52 into which a high-energy processing beam 56 in the form of a laser beam, generated by a laser beam source (not shown), is coupleable via an optical fiber 54 in order to machine the workpiece W.

The high-energy processing beam 56 passes through a collimating lens 58 that is adjustable in position according to the arrow 60. As a result, the processing beam 56 strikes a semi-transparent mirror 62 and is reflected to a movable further deflection unit 64, more precisely, a processing beam deflection unit 64. The movable processing beam deflection unit 64 in FIG. 1 is likewise designed in the form of a galvanometer scanner that may be moved about two axes in the direction of the two arrows 66, 68 in order to deflect the processing beam 56 in the desired manner. Instead of the galvanometer scanner 64 shown, it is possible to design the movable processing beam deflection unit 64 in the form of some other displaceable optical component, for example a wobble mirror, a rotatable wedge plate, or the like.

In the exemplary embodiment shown, situated downstream from the processing beam deflection unit 64 is a focus lens 70 through which the processing beam 56 passes, and for machining, the processing beam is focused on the workpiece W by the focus lens. It is understood that it is alternatively possible to provide the focus lens 70 upstream from the deflection unit in order to focus the processing beam.

After deflection by the movable measuring beam deflection unit 42, the optical measuring beam 28 is coupled into the machining device 12 via the above-mentioned shared interface 48. More precisely, the optical measuring beam 28 strikes the semi-transparent mirror 62 and passes through it, as the result of which the optical measuring beam 28 is essentially coaxially superimposed on the processing beam 56. The optical measuring beam 28 therefore likewise strikes the movable processing beam deflection unit 64 and subsequently passes through the focus lens 70 after it has been deflected by the movable processing beam deflection unit 64.

The exemplary embodiment illustrated in FIG. 1 shows an exact superimposition of the optical measuring beam 28 on the processing beam 56, between the semi-transparent mirror 62 and the processing beam deflection unit 64, so that only a shared beam path S is illustrated at that location.

However, since the optical measuring beam 28 in FIG. 1, in contrast to the high-energy processing beam 56, is deflected not only by the movable processing beam deflection unit 64 but also by the movable measuring beam deflection unit 42, the optical measuring beam 28 is displaceable on the workpiece W independently of the high-energy processing beam 56. This is depicted in FIG. 1 by the three dashed lines 28', 28", and 28'", which show three alternative displacements of the optical measuring beam 28 at different measuring positions on the workpiece W. In this regard, reference is also made to FIG. 2 for a detailed explanation of the functional principle according to the invention.

Figure 2:
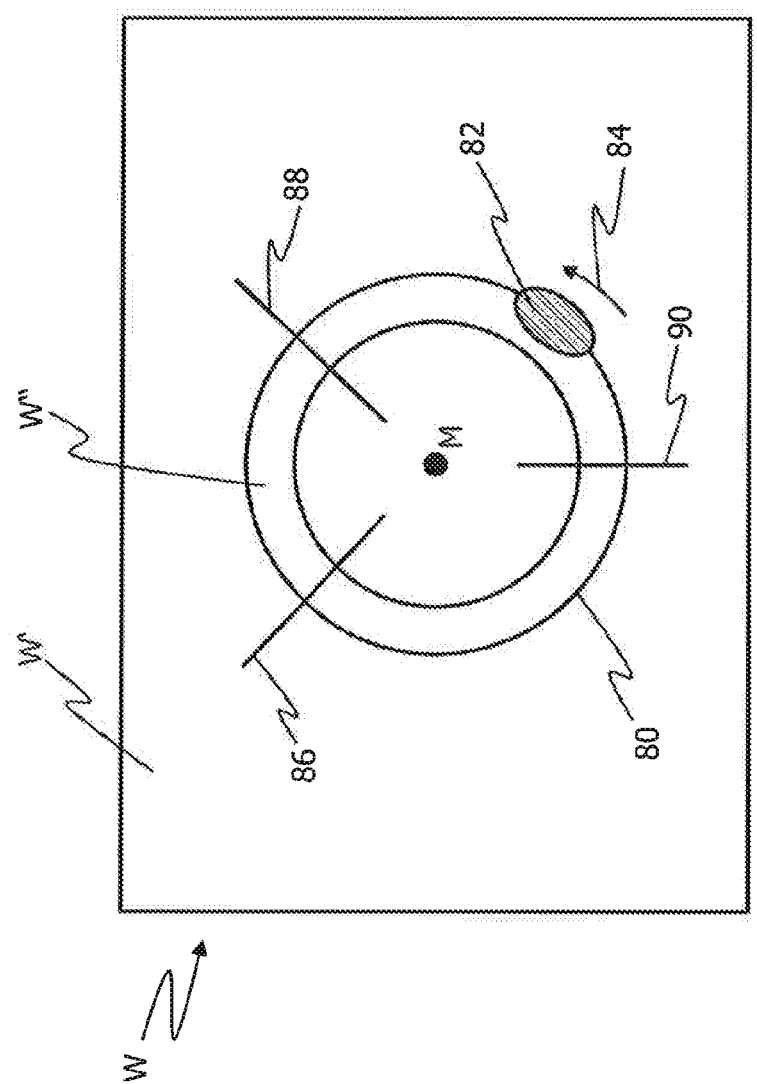
FIG. 2 shows a top view of a workpiece to be machined along a circular main machining path.

FIG. 2 illustrates the workpiece W to be machined along a main machining path 80, shown in a top view in FIG. 1, in an enlarged, detailed view. According to the example shown, the workpiece W includes a plate-shaped workpiece part W' in the form of a metal sheet and a cylindrical workpiece part W", in the form of an elongated tube, to be welded. As a result, the main machining path 80 in the exemplary embodiment shown corresponds to the contour of a closed geometric figure, namely, a circle.

The high-energy processing beam 56 produces a melt bath 82 on the workpiece W, and for welding the workpiece parts W', W" is displaceable on a circular path along the main machining path 80, indicated by the arrow 84. The displacement of the high-energy processing beam 56 on the workpiece W, and preferably an additional relative movement between the workpiece W and a robot (not shown) supporting the system 100, may be ensured, for example, by the processing beam deflection unit 64 shown in FIG. 1.

To monitor and/or control the laser welding process, the measuring device is configured for determining characteristic features of the closed geometric figure represented by the main machining path 80. With knowledge of the exact type, location, and/or size of this geometric figure, the high-energy processing beam may be precisely moved along the main machining path 80, as the result of which satisfactory weld seam quality may be ensured.

To determine characteristic features of the geometric figure represented by the main machining path 80, the optical measuring beam 28 for collecting measuring data is displaced on the workpiece W in succession at least along a first discrete measuring line 86, along a second discrete measuring line 88, and along a third discrete measuring line 90, in each case transversely with respect to the main machining path 80 and intersecting same. It is understood that the optical measuring beam 28 according to the system 100 shown in FIG. 1 is displaceable on the workpiece W along the at least three discrete measuring lines 86, 88, 90, for example by means of the movable measuring beam deflection unit 42 and/or by means of the movable processing beam deflection unit 64. If, for example, monitoring is to be carried out during the machining process, the optical measuring beam 28 is displaced on the workpiece W by means of the movable measuring beam deflection unit 42 and by means of the movable processing beam deflection unit 64. In contrast, if the monitoring is to take place before or after the machining process, the optical measuring beam 28 may be displaced on the workpiece W solely by means of the measuring beam deflection unit 42 or by means of the processing beam deflection unit 64, since in this case it is not necessary to achieve or take into account displacement of the processing beam 56. If the displacement of the optical measuring beam 28 is achieved, for example, only by means of the movable processing beam deflection unit 64, the additional movable measuring beam deflection unit of the measuring device 10 may be dispensed with.

Three positions of the main machining path 80 on the workpiece W may be precisely determined by scanning a plurality of measuring points along the at least three discrete measuring lines 86, 88, 90, based on the measuring data thus collected. Lastly, characteristic features of the main machining path 80 are determinable therefrom. Since the geometric figure represented by the main machining path in the example shown is a circle, the midpoint M and/or the diameter D and/or the radius R may be calculated in a known manner, using the general equation for a circle $(x-a)^2+(y-b)^2=r^2$ with radius r and midpoint coordinates (a/b).

It is also possible that in further embodiments the optical measuring beam may be displaceable on the workpiece along any given number of discrete measuring lines. Scanning more than three discrete measuring lines may be necessary, for example, when the geometric figure represented by the main machining path is not a circle.

In the figure described below, comparable or similar and functionally equivalent components and features are provided with the same reference numerals as in FIGS. 1 and 2. The components and features that are not described again with reference to FIG. 3 have a design and function similar to the corresponding components and features according to FIGS. 1 and 2.

Figure 3:
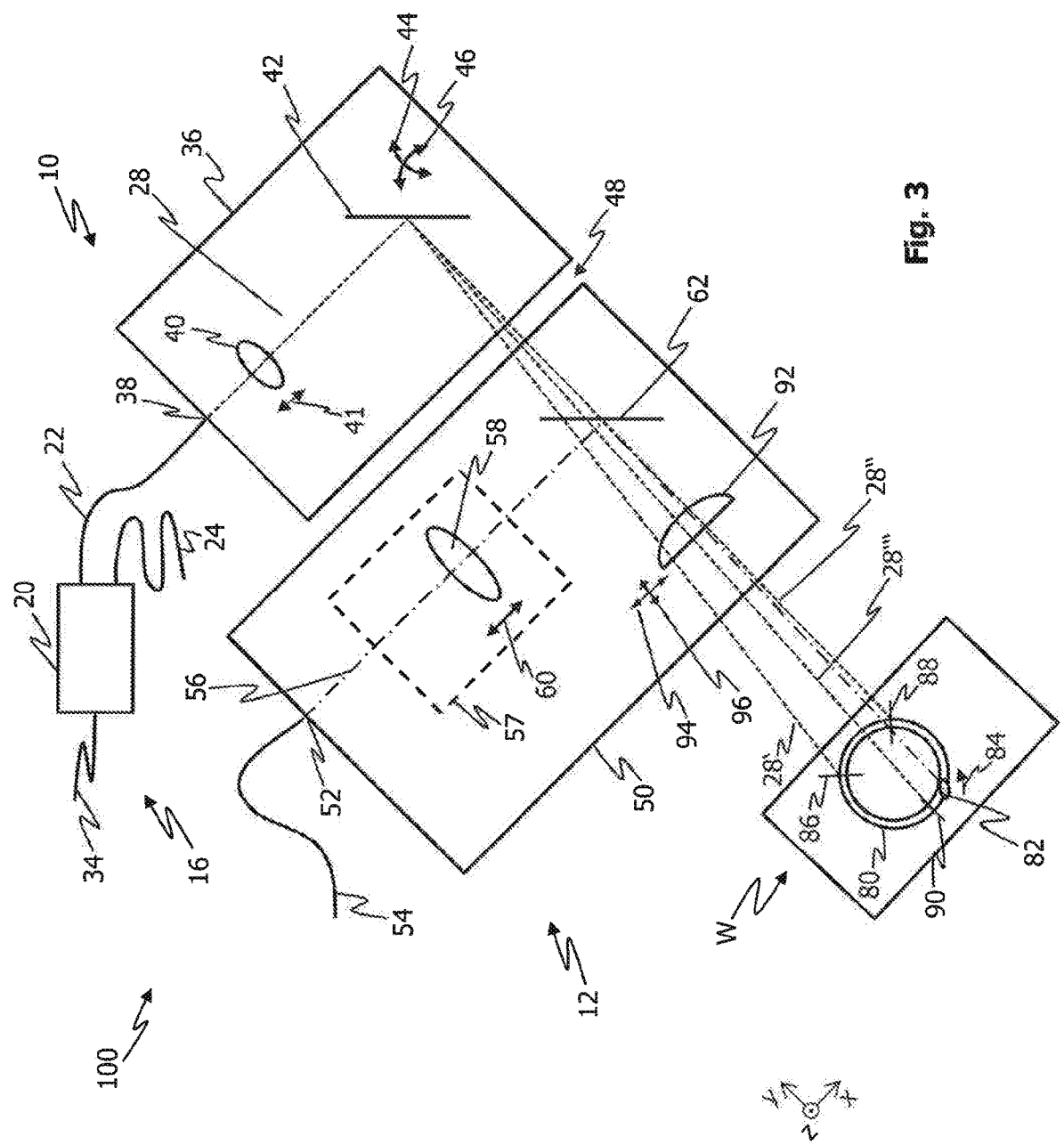
FIG. 3 shows an overall view of a second exemplary embodiment of a system according to the invention, with a measuring device and a machining device.

The overall arrangement of a second exemplary embodiment of the invention shown in FIG. 3 is essentially the same as the above-described overall arrangement according to the first exemplary embodiment of the invention shown in FIG. 1. For this reason, the following discussion focuses in particular on the differences between the second exemplary embodiment according to FIG. 3 and the first exemplary embodiment according to FIG. 1.

The system 100 according to the invention in the second exemplary embodiment likewise includes a measuring device 10 and a machining device 12 connected thereto.

In the measuring device 10 shown in FIG. 3, of the optical coherence tomography unit 16, only the beam splitter 20 and the optical fibers 22, 24, and 34 connected thereto are illustrated for reasons of clarity. However, it is understood that the optical coherence tomography unit 16 of the second exemplary embodiment has the same design as in FIG. 1.

The optical measuring beam 28 is coupled into the measuring optics 36 via the interface 38 and passes through the displaceable collimating lens 40. The optical measuring beam 28 in the measuring optics 36 subsequently strikes the movable measuring beam deflection unit 42. The movable measuring beam deflection unit in FIG. 3 is likewise designed in the form of a galvanometer scanner that is movable about two axes in the direction of the arrows 44, 46 in order to deflect the optical measuring beam 28 in the desired manner and move it to different measuring positions or points on the workpiece W. Alternatively, in further exemplary embodiments the measuring beam deflection unit 42 may also be immovable or designed in the form of some other displaceable optical component, for example in the form of a wobble mirror, a rotating wedge plate, or the like.

While the measuring optics 36 of the measuring device 10 of the second exemplary embodiment correspond essentially to the measuring optics 36 of the measuring device 10 of the first exemplary embodiment, the machining optics 12 of the two exemplary embodiments differ from one another.

As is apparent from FIG. 3, the high-energy processing beam 56 propagates, starting from the interface 52, and in the machining optics 50 passes through an optical system 57 having the displaceable collimating lens 58, which is adjustable in the direction of the arrow 60. However, it is possible for the optical system 57 to include even further movable and/or immovable optical components that influence the high-energy processing beam 56.

After the optical system 57 and the displaceable collimating lens 58, the high-energy processing beam 56 strikes the semi-transparent mirror 62 and is deflected by same, i.e., reflected in the direction of a movable focus lens 92. In the second exemplary embodiment shown in FIG. 3, the movable focus lens 92 is displaceable in the direction of the arrows 94, 96, transversely with respect to the direction of an optical axis of the high-energy processing beam 56 and transversely with respect to the direction of an optical axis of the optical measuring beam. The movable focus lens 92 according to FIG. 3 thus represents a movable processing beam deflection unit. It is understood that the arrows 94, 96 denote displacement directions of the focus lens 92 strictly by way of example. In further embodiments of the invention, however, the focus lens 92 may be designed to be displaceable in any given direction transverse to the optical axis of the high-energy processing beam 56 and/or of the optical measuring beam 28. In addition, in further embodiments of the invention, the focus lens 92 may be displaceable (not illustrated) in the direction of the optical axis of the high-energy processing beam 56 in order to adjust a focal plane of the high-energy processing beam 56.

An additional processing beam deflection unit in the form of a galvanometer scanner is not provided in the second exemplary embodiment.

The movable focus lens 92 focuses the high-energy processing beam 56 on the workpiece W to be machined, and may change the position of the high-energy processing beam 56 on the workpiece W by moving the focus lens 92 transversely with respect to the optical axis of the processing beam. Via cooperation of the displacement of the optical components 58, 92 of the machining optics and a possible robot movement of a robot coupled to the system 100, the position of the instantaneous machining area may be changed, for example to move it on the workpiece W along the main machining path 80.

The machining optics 50 and the measuring optics 36 are connected to one another via the shared interface 48. The optical measuring beam 28, after the deflection by the measuring beam deflection unit 42, is coupled into the machining optics 50 via this shared interface 48. More precisely, the optical measuring beam 28 in the machining optics 50 strikes the semitransparent mirror 62 and passes through it, as the result of which the optical measuring beam 28 may be superimposed on the high-energy processing beam 56. Since the semi-transparent mirror 62 is permeable with regard to the wavelength ranges of the optical measuring beam 28, it does not affect the optical measuring beam 28.

After passing through the semi-transparent mirror 62, the optical measuring beam 28 likewise passes through the movable focus lens 92 and subsequently strikes the workpiece W to be machined.

To determine characteristic features of the geometric figure represented by the main machining path 80, also according to the second exemplary embodiment the optical measuring beam for collecting measuring data 28 is displaced on the workpiece W in succession at least along the first discrete measuring line 86, along the second discrete measuring line 88, and along the third discrete measuring line 90, in each case transversely with respect to the main machining path 80 and intersecting same.

For this purpose, according to the system 100 shown in FIG. 3 the optical measuring beam 28 is displaceable on the workpiece W along the at least three discrete measuring lines 86, 88, 90, for example by means of the movable measuring beam deflection unit 42 and/or by means of the movable focus lens 92. If, for example, monitoring is to be carried out during the machining process, the optical measuring beam 28 is displaced on the workpiece W by means of the movable measuring beam deflection unit 42 and by means of the movable focus lens 92. In contrast, if the monitoring is to take place before or after the machining process, the optical measuring beam 28 may be displaced on the workpiece W solely by means of the measuring beam deflection unit 42 or by means of the focus lens 92, since in this case it is not necessary to achieve or take into account displacement of the processing beam 56. If the displacement of the optical measuring beam 28 is achieved, for example, only by means of the movable focus lens 92, the additional movable measuring beam deflection unit of the measuring device 10 may be dispensed with.

It is understood by those skilled in the art that, within the scope of the invention, the above-described components and features of the first and second exemplary embodiments of the invention may be arbitrarily combined with one another.

The invention claimed is:

1. A measuring device for monitoring a machining process comprising a welding process,
   wherein the measuring device is connected or connectable to a machining device for machining a workpiece by means of a high-energy processing beam that is displaceable on the workpiece along a main machining path that is linear or that corresponds to a contour of an open or closed geometric figure, wherein the measuring device includes an optical coherence tomography unit having a measuring beam source for generating an optical measuring beam that is displaceable on the workpiece by means of at least one movable deflection unit, the at least one moveable deflection unit being a measuring beam deflection unit of the measuring device that deflects only the optical measuring beam, and the optical measuring beam being additionally deflectable by means of a movable processing beam deflection unit of the machining device that deflects the optical measuring beam and the processing beam, and wherein the optical measuring beam for collecting measuring data by means of the at least one movable deflection unit is displaceable on the workpiece along at least one first discrete measuring line, transversely with respect to the main machining path and intersecting same, wherein the measuring device is configured for determining characteristic features of the geometric figure represented by the main machining path, according to the collected measuring data.

2. The measuring device according to claim 1, wherein the geometric figure is a circle, wherein the measuring device is configured for determining at least one selected from the group comprising a position of a midpoint of the circle on the workpiece and a diameter of the circle according to the collected measuring data.

3. The measuring device according to claim 1, wherein the measuring device is configured for determining, during the machining process, the characteristic features of the geometric figure represented by the main machining path.

4. The measuring device according to claim 1, wherein the measuring beam deflection unit is configured for displacing the optical measuring beam, taking into account a deflection motion of the optical measuring beam by the processing beam deflection unit.

5. The measuring device according to claim 1, wherein the at least one movable deflection unit includes a displaceable biaxial scanner system.

6. The measuring device according to claim 1, wherein the at least one movable deflection unit includes a focus lens or collimating lens that is displaceable laterally with respect to an optical axis of the measuring beam.

7. The measuring device according to claim 1, wherein the measuring device is movable relative to the workpiece by means of a robot that is coupled to the measuring device, wherein the at least one deflection unit is configured for displacing the optical measuring beam, taking into account a movement of the measuring device by the robot.

8. The measuring device according to claim 1, wherein for collecting measuring data by means of the at least one movable deflection unit, the measuring device is additionally displaceable on the workpiece along a second discrete measuring line.

9. A system for machining and monitoring a workpiece, including a machining device and a measuring device that is connected to the machining device, wherein the machining device is configured for machining the workpiece by means of a high-energy processing beam, which is displaceable on the workpiece along a main machining path that corresponds to a contour of a closed geometric figure, by means of a movable processing beam deflection unit of the machining device;

wherein the measuring device includes an optical coherence tomography unit with a measuring beam source for generating an optical measuring beam, which is displaceable on the workpiece by means of (i) at least one movable measuring beam deflection unit of the measuring device that deflects only the optical measuring beam and (ii) the movable processing beam deflection unit of the machining device that deflects the optical measuring beam and the high- energy processing beam;

wherein the optical measuring beam for collecting measuring data by means of (i) the at least one movable measuring beam deflection unit of the measuring device and (ii) the movable processing beam deflection unit of the machining device is displaceable on the workpiece along at least one first discrete measuring line, in each case transversely with respect to the main machining path and intersecting same; and wherein the measuring device is configured for determining characteristic features of the geometric figure represented by the main machining path, according to the collected measuring data.

10. The system according to claim 9, wherein the geometric figure is a circle, wherein the measuring device is configured for determining at least one selected from the group comprising a position of a midpoint of the circle on the workpiece and a diameter of the circle according to the collected measuring data.

11. The system according to claim 9, wherein the measuring device is configured for determining the characteristic features of the geometric figure represented by the main machining path during the machining of the workpiece by the machining device.

12. The system according to claim 9, wherein the at least one movable measuring beam deflection unit of the measuring device is configured for displacing the optical measuring beam, taking into account a deflection motion of the optical measuring beam by the processing beam deflection unit of the machining device.

13. The system according to claim 9, wherein at least one selected from the group comprising (i) the at least one movable measuring beam deflection unit of the measuring device and (ii) the movable processing beam deflection unit of the machining device includes a displaceable biaxial scanner system.

14. The system according to claim 9, wherein at least one selected from the group comprising (i) the at least one movable measuring beam deflection unit of the measuring device and (ii) the movable processing beam deflection unit of the machining device includes a focus lens or collimating lens that is displaceable laterally with respect to an optical axis of the measuring beam.

15. The system according to claim 9, wherein the system is movable relative to the workpiece by means of a robot that is coupled to the system, wherein at least one selected from the group comprising (i) the at least one measuring beam deflection unit of the measuring device and (ii) the movable processing beam deflection unit of the machining device is configured for displacing the optical measuring beam, taking into account a movement of the system by the robot.

16. The system according to claim 9, wherein for collecting measuring data by means of the at least one movable deflection unit, the measuring device is additionally displaceable on the workpiece along a second discrete measuring line.

17. A method for monitoring a machining process of a workpiece by means of a high-energy processing beam of a machining device that is displaced on the workpiece along a main machining path that corresponds to a contour of a closed geometric figure, wherein the method comprises the steps:

- generating an optical measuring beam by means of a measuring beam source of an optical coherence tomography unit; and
- displacing the optical measuring beam on the workpiece by means of at least one movable deflection unit, the at least one moveable deflection unit being a measuring beam deflection unit of the measuring device that deflects only the optical measuring beam, and the optical measuring beam being additionally deflectable by means of a movable processing beam deflection unit of the machining device that deflects the optical measuring beam and the high-energy processing beam,
- wherein the optical measuring beam for collecting measuring data is displaced on the workpiece by means of the at least one movable deflection unit along at least one first discrete measuring line, in each case transversely with respect to the main machining path and intersecting same, and
- wherein characteristic features of the geometric figure represented by the main machining path are determined by means of the measuring device, according to the collected measuring data.

18. The method according to claim 17, wherein the optical measuring beam for collecting measuring data by means of the at least one movable deflection unit of the measuring device is additionally displaced on the workpiece along a second discrete measuring line.

\* \* \* \* \*